US009883396B2

(12) United States Patent
Rodriguez

(10) Patent No.: US 9,883,396 B2
(45) Date of Patent: Jan. 30, 2018

(54) CONTEXT-RELATED ARRANGEMENTS

(71) Applicant: Digimarc Corporation, Beaverton, OR (US)

(72) Inventor: Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/273,375

(22) Filed: Sep. 22, 2016

(65) Prior Publication Data

US 2017/0078883 A1    Mar. 16, 2017

Related U.S. Application Data

(62) Division of application No. 14/518,748, filed on Oct. 20, 2014, now Pat. No. 9,462,433, which is a division
(Continued)

(51) Int. Cl.
*H04W 12/06* (2009.01)
*H04W 4/12* (2009.01)
(Continued)

(52) U.S. Cl.
CPC ......... *H04W 12/06* (2013.01); *H04M 1/7253* (2013.01); *H04M 1/72569* (2013.01);
(Continued)

(58) Field of Classification Search
CPC .... H04W 12/06; H04W 12/04; H04M 1/7253
(Continued)

(56) References Cited

U.S. PATENT DOCUMENTS 6,829,368 B2    12/2004   Meyer et al.
7,043,048 B1    5/2006    Ellingson
(Continued)

OTHER PUBLICATIONS

Bichler et al, Key generation based on acceleration data of shaking processes, UbiComp 2007, LNCS vol. 4717, pp. 304-317.
(Continued)

*Primary Examiner* — Cong Tran
(74) *Attorney, Agent, or Firm* — Digimarc Corporation

(57) ABSTRACT

In one arrangement, a first device presents a display that is based on context data, derived from one or more of its sensors. This display is imaged by a camera in a second device. The second device uses context data from its own sensors to assess the information in the captured imagery, and makes a determination about the first device. In another arrangement, social network friend requests are automatically issued, or accepted, based on contextual similarity. In yet another arrangement, delivery of a message is triggered by a contextual circumstance other than (or in addition to) location. In still another arrangement, two or more devices automatically establish an ad hoc network (e.g., Bluetooth pairing) based on contextual parallels. In still another arrangement, historical context information is archived and used in transactions with other devices, e.g., in challenge-response authentication. A great number of other features and arrangements—many involving head-mounted displays—are also detailed.

20 Claims, 6 Drawing Sheets

Related U.S. Application Data of application No. 13/651,182, filed on Oct. 12, 2012, now Pat. No. 8,868,039.

(60) Provisional application No. 61/546,494, filed on Oct. 12, 2011.

(51) Int. Cl.
| | | |
|---|---|---|
| *H04W 4/00* | (2009.01) | |
| *H04M 1/725* | (2006.01) | |
| *H04W 12/04* | (2009.01) | |
| *H04M 1/05* | (2006.01) | |
| *H04W 84/14* | (2009.01) | |

(52) U.S. Cl.
CPC .............. *H04W 4/008* (2013.01); *H04W 4/12* (2013.01); *H04W 12/04* (2013.01); *H04M 1/05* (2013.01); *H04M 2250/52* (2013.01); *H04W 84/14* (2013.01)

(58) Field of Classification Search
USPC .............................. 455/411, 254, 41.1, 41.2
See application file for complete search history.

(56) References Cited

U.S. PATENT DOCUMENTS

| | | |
|---|---|---|
| 7,123,740 B2 | 10/2006 | McKinley |
| 7,503,488 B2 | 3/2009 | Davis |
| 7,587,601 B2 | 9/2009 | Levy et al. |
| 7,587,602 B2 | 9/2009 | Rhoads |
| 7,693,965 B2 | 4/2010 | Rhoads |
| 8,103,877 B2 | 1/2012 | Hannigan et al. |
| 8,116,685 B2 | 2/2012 | Bregman-Amitai et al. |
| 8,294,569 B2 | 10/2012 | Thorn et al. |
| 8,296,686 B1 | 10/2012 | Tedesco et al. |
| 8,441,356 B1 | 5/2013 | Tedesco et al. |
| 8,498,627 B2 | 7/2013 | Rodriguez |
| 8,676,273 B1 | 3/2014 | Fujisaki |
| 8,738,024 B1 | 5/2014 | Kerr et al. |
| 2002/0164962 A1 | 11/2002 | Mankins et al. |
| 2004/0013243 A1 | 1/2004 | Harris |
| 2006/0170669 A1* | 8/2006 | Walker ................. G06F 3/0362 345/418 |
| 2006/0270421 A1 | 11/2006 | Phillips et al. |
| 2007/0123220 A1 | 5/2007 | Weiser et al. |
| 2007/0168332 A1 | 7/2007 | Bussard et al. |
| 2007/0174613 A1 | 7/2007 | Paddon et al. |
| 2007/0226527 A1 | 9/2007 | Ang |
| 2009/0018929 A1 | 1/2009 | Weathers |
| 2009/0061837 A1 | 3/2009 | Chaudhri et al. |
| 2009/0085873 A1 | 4/2009 | Betts et al. |
| 2010/0256825 A1* | 10/2010 | Nielsen ................. G06Q 10/06 700/283 |
| 2010/0323657 A1 | 12/2010 | Barnard et al. |
| 2011/0076942 A1 | 3/2011 | Taveau et al. |
| 2011/0106736 A1 | 5/2011 | Aharonson et al. |
| 2011/0117877 A1 | 5/2011 | Ghazarian |
| 2011/0135071 A1 | 6/2011 | Milstein |
| 2011/0161076 A1 | 6/2011 | Davis et al. |
| 2011/0176706 A1 | 7/2011 | Levy |
| 2011/0187652 A1 | 8/2011 | Huibers |
| 2011/0191438 A1 | 8/2011 | Huibers et al. |
| 2011/0191823 A1 | 8/2011 | Huibers |
| 2011/0212717 A1 | 9/2011 | Rhoads et al. |
| 2011/0219080 A1 | 9/2011 | McWithey et al. |
| 2011/0251892 A1 | 10/2011 | Laracey |
| 2011/0289224 A1 | 11/2011 | Trott |
| 2011/0293094 A1 | 12/2011 | Os et al. |
| 2011/0295502 A1 | 12/2011 | Faenger |
| 2011/0314549 A1 | 12/2011 | Song et al. |
| 2012/0009896 A1 | 1/2012 | Bandyopadhyay et al. |
| 2012/0086606 A1 | 4/2012 | Mathews et al. |
| 2012/0150790 A1 | 6/2012 | Angell et al. |
| 2012/0179992 A1 | 7/2012 | Smuga et al. |
| 2012/0221687 A1 | 8/2012 | Hunter et al. |
| 2012/0264446 A1* | 10/2012 | Xie .......................... G01C 22/00 455/456.1 |
| 2012/0278155 A1 | 11/2012 | Faith |
| 2012/0327252 A1 | 12/2012 | Nichols et al. |
| 2013/0041759 A1* | 2/2013 | Mikan ................ G06Q 30/0269 705/14.66 |
| 2013/0130714 A1 | 5/2013 | Huibers et al. |
| 2013/0339358 A1 | 12/2013 | Huibers et al. |

OTHER PUBLICATIONS

Gartner Says the Use of Mobile Fraud Detection in Mobile Commerce Environments is Imperative, Press Release, Sep. 20, 2010.

Kunze, et al, Symbolic object localization through active sampling of acceleration and sound signatures, Proc. of 9th Int'l Conf on Ubiquitous Computing, 2007, pp. 163-180.

Malek, et al, A Framework for Context-Aware Authentication, 2008 IET 4th Int'l Conf on Intelligent Environments, 2008, pp. 1-8.

Mathur, et al, ProxiMate—Proximity-based Secure Pairing Using Ambient Wireless Signals, Proc 9th Int'l Conf on Mobile Systems, Applications, and Services, Jun. 2011, pp. 211-224.

Mayrhofer, A Context Authentication Proxy for IPSec Using Spatial Reference, Int'l Workshop on Trustworthy Computing, 2006, pp. 449-462.

Mayrhofer, et al, Shake well before use—Intuitive and secure pairing of mobile devices, IEEE Trans. on Mobile Computing, vol. 8, No. 6, Jun. 2009, pp. 792-806.

Mayrhofer, et al, Using a Spatial Context Authentication Proxy for Establishing Secure Wireless Communications, J. of Mobile Multimedia, 2006, pp. 198-217.

Mayrhofer, Spontaneous mobile device authentication based on sensor data, Information Security Technical Report 13, 2008, pp. 136-150.

Mayrhofer, The candidate key protocol for generating secret shared keys from similar sensor data streams, Security and Privacy in Ad-hoc and Sensor Networks, 2007, pp. 1-15.

Now You Can Bump iOS Devices to Share Music, Mashable, Nov. 12, 2010.

Schurmann, Secure communication based on ambient audio, IEEE Trans on Mobile Computing, 2011.

Scott, et al, Audio location—Accurate low-cost location sensing, Pervasive 2005. LNCS, vol. 3468, 2005, pp. 307-311.

Sigg, Context-based security—State of the art, open research topics and a case study, 5th ACM Int'l Workshop on Context-Awareness for Self-Managing Systems, Sep. 17, 2011.

Sigg, Entropy of Audio Fingerprints for Unobtrusive Device Authentication, Proc. of the 7th Int'l and Interdisciplinary Conference on Modeling and Using Context, Sep. 26, 2011, pp. 296-299.

* cited by examiner

CONTEXT-RELATED ARRANGEMENTS

RELATED APPLICATION DATA

This application is a division of application Ser. No. 14/518,748, filed Oct. 20, 2014 (now U.S. Pat. No. 9,462, 433), which is a division of application Ser. No. 13/651,182, filed Oct. 12, 2012 (now U.S. Pat. No. 8,868,039), which claims priority benefit to provisional application 61/546, 494, filed Oct. 12, 2011.

BACKGROUND AND INTRODUCTION

Context may be defined as any information useful in characterizing the situation of an entity. An entity is a person, place or object that is considered relevant to the interaction between a user and an application, including the user and applications themselves.

Such information can be of many sorts, including computing context (network connectivity, memory availability, processor type, CPU contention, etc.), user context (user profile, location, actions, preferences, nearby friends, social network(s) and situation, etc.), physical context (e.g., lighting, noise level, traffic, etc.), temporal context (time of day, day, month, season, etc.), history of the above, etc.

Context information finds many applications in mobile devices. For example, "Bump" is a smartphone app for exchanging business card-like information between two users' devices. Each phone running the app senses a physical "bump" that occurs when two phones are touched together. Each phone sends a time-stamped report of such event to a Bump server, together with information about the phone's GPS location, and information about the strength of the bump. The Bump server examines the incoming reports to identify corresponding pairs of bumps, based on similarity in time, location, and bump strength. When such a match is found, the server provides to each phone the contact information for the other user. (The same technology can also be used to exchange songs, photos, and other information between bumped devices.) The Bump technology is further detailed in patent application 20110191823. Related technology is described in patent application 20110076942.

Location information is another type of context data, and is sometimes used as a fraud-prevention measure, e.g., in connection with credential presentation. For example, U.S. Pat. No. 7,503,488 teaches that if a driver's license is presented as a form of identification by a person cashing a check in New York, and the same license is presented an hour later by a traveler checking in for a flight in Los Angeles, something is amiss. Similarly, if a user presents a bankcard to an ATM in Phoenix, while GPS tracking indicates the user's cell phone is in Atlanta, the bank may treat the ATM transaction as suspect.

In accordance with aspects of the present technology, context information is used in novel and useful ways. In one particular implementation, a first smartphone presents a screen display that is based on context data, derived from one or more of its sensors. This screen display is imaged by a camera in a second smartphone. The second smartphone uses its own context data to assess the information in the captured imagery, to make a determination about the first smartphone.

In accordance with another aspect of the present technology, social network friend requests are automatically issued, or accepted, based on contextual similarity.

In accordance with still another aspect of the present technology, delivery of a message to a user is triggered by a contextual circumstance other than (or in addition to) location.

In accordance with yet another aspect of the present technology, two or more devices automatically establish an ad hoc network (e.g., Bluetooth pairing) based on contextual parallels.

In accordance with still another aspect of the technology, context information is stored in a memory, and serves as a history archive that is used in transactions with other devices, e.g., in challenge-response authentication.

Many other aspects of the technology concern wearable computers (e.g., head-mounted display systems), and related uses of context.

The foregoing and additional features and advantages of the present technology will be more readily apparent from the following detailed description, which proceeds with reference to the accompanying drawings.

DETAILED DESCRIPTION

Figure 1:
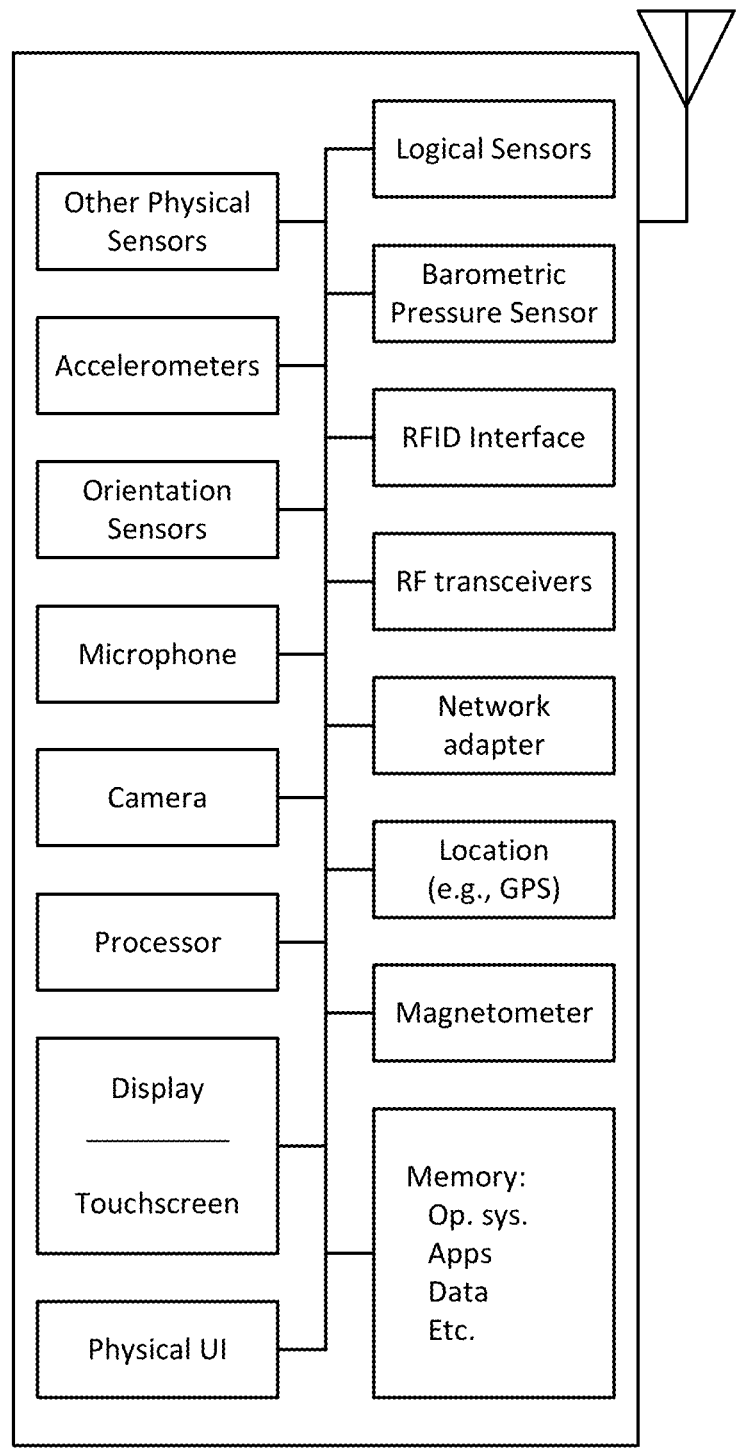
FIG. 1 is a block diagram of a representative smartphone.

FIG. 1 depicts an illustrative smartphone. This phone includes a processor and memory. The memory stores various software and information used by the phone, including operating system software, application software, data, etc. (The functionality detailed herein may be implemented in the operating system of a smartphone, or as application software, or as a hybrid.)

The detailed phone further includes a display screen that also serves as a touch input device. It also includes one or more physical user interface (UI) elements, such as buttons or switches to control different aspects of operation.

The depicted phone also includes various communications technologies. In addition to a cellular radio transceiver (e.g., 4G "WiMax" or LTE), the phone also includes WiFi (802.11) and Bluetooth transceivers. Also included is an RFID interface, which can both transmit signals to RFID chips (aka Near Field Chips), and also receive responsive signals in return.

The detailed smartphone further includes a variety of sensors, including a 3D accelerometer, a 3D gyroscopic sensor, a 3D magnetometer, a barometric pressure sensor, one or more microphones, one or more cameras, a location sensor (e.g., a GPS module), etc.

The phone also includes various "logical sensors." These sensors include software modules that take input data from one or (typically) two or more physical sensors, and draw inferences or otherwise further process the physical sensor data, to yield enhanced information. (Many logical sensors retain state. For example, a classifier (a type of logical sensor) typically has been trained, and relies on that knowledge to perform its action. In contrast, physical sensors are generally state-less.)

As indicated, one type of logical sensor is a classifier. As is familiar to artisans, classification is the problem of identifying to which of a set of categories (sub-populations) a new observation belongs. (A familiar classification problem is identifying email as spam or not-spam.) An algorithm or procedure that implements classification is known as a classifier.

Typically, the various classification categories are defined so as to have immediate meaning to humans (e.g., speech/music/silence, walking/running/flying, etc.), rather than being characterized by numeric values or ranges of technical parameters divorced from any human meaning.

(Classification is often performed by reference to a training set of data, comprising observations whose category membership is known. Classification, in this sense, may be regarded as an instance of supervised machine learning, i.e., learning in which a training set of correctly-identified observations is available. The corresponding unsupervised procedure is sometimes termed clustering, and involves grouping data into categories based on some measure of inherent similarity (e.g. the distance between instances, considered as vectors in a multi-dimensional vector space). For purposes of the present application, classification includes clustering—provided the output of the process identifies a category that has semantic meaning to human users.)

An exemplary classifier is an audio classifier. An audio classifier takes audio sensed by a microphone, and classifies it into one of several categories, e.g., speech, music or silence. It may further classify it by volume (for speech and music), e.g., quiet, mid, or loud (based on stored threshold information). In some implementations the audio classifier may perform a speech-to-text operation, yielding text data corresponding to speech sampled by the smartphone microphone.

Another logical sensor is a visual classifier. This classifier takes input imagery sensed by a camera, and again classifies it into one of several categories, e.g., contains-face, contains-nature, etc. Myriad classifiers are known; a familiar one identifies specific faces in a collection of Picasa or Facebook images. Object classifiers are widely used in machine vision systems.

Relevant to some embodiments of the present technology are facial expression classifiers. Such arrangements sense facial features to evaluate the subject's facial affect. From the resulting information, the subject's mental state can be inferred. (Particular examples are detailed in Affectiva's patent publication US20120243751. Arrangements for sensing the user's own facial affect are detailed in Scheirer, et al, Expression Glasses—A Wearable Device for Facial Expression Recognition, MIT Media Laboratory Perceptual Computing Section Technical Report No. 484, 1999.)

Another logical sensor is an activity classifier. This classifier examines available sensor data, and makes a conclusion about the user's activity. For example, it may take information from a GPS module and discern the user's speed and direction (e.g., west at 400 mph), and also take information from an audio sensor or classifier that indicates the ambient environment has a constant dull roar (indicative of an airplane cabin), and also take information from a barometric sensor indicating the smartphone is at extraordinarily low atmospheric pressure (e.g., 23.5 inches of mercury). Based on this data (and optionally historical information about the user), the activity classifier may output data concluding that the user is traveling on an airplane—most likely going from New York to Los Angeles.

Many of the examples that follow assume a transaction is about to be performed between two smartphones. However, the technology can be employed in many other situations.

In one arrangement, a first smartphone obtains one or more context parameters from one or more of its sensors (physical or logical). These parameters may comprise, by way of example and not limitation: date and/or time of day, information based on audio recently sampled by the smartphone, information based on visual stimulus recently sensed by the smartphone, sensed radio transmissions, sensed RFID data, orientation sensor data, sensed magnetometer data, sensed accelerometer data, barometric sensor data, audio/visual/activity classification data, etc.

Based on such parameter(s), the first smartphone generates an image, and presents it on the smartphone screen, where it can be sensed by a camera of a second smartphone (e.g., to authenticate a smartphone transaction).

Figure 2:
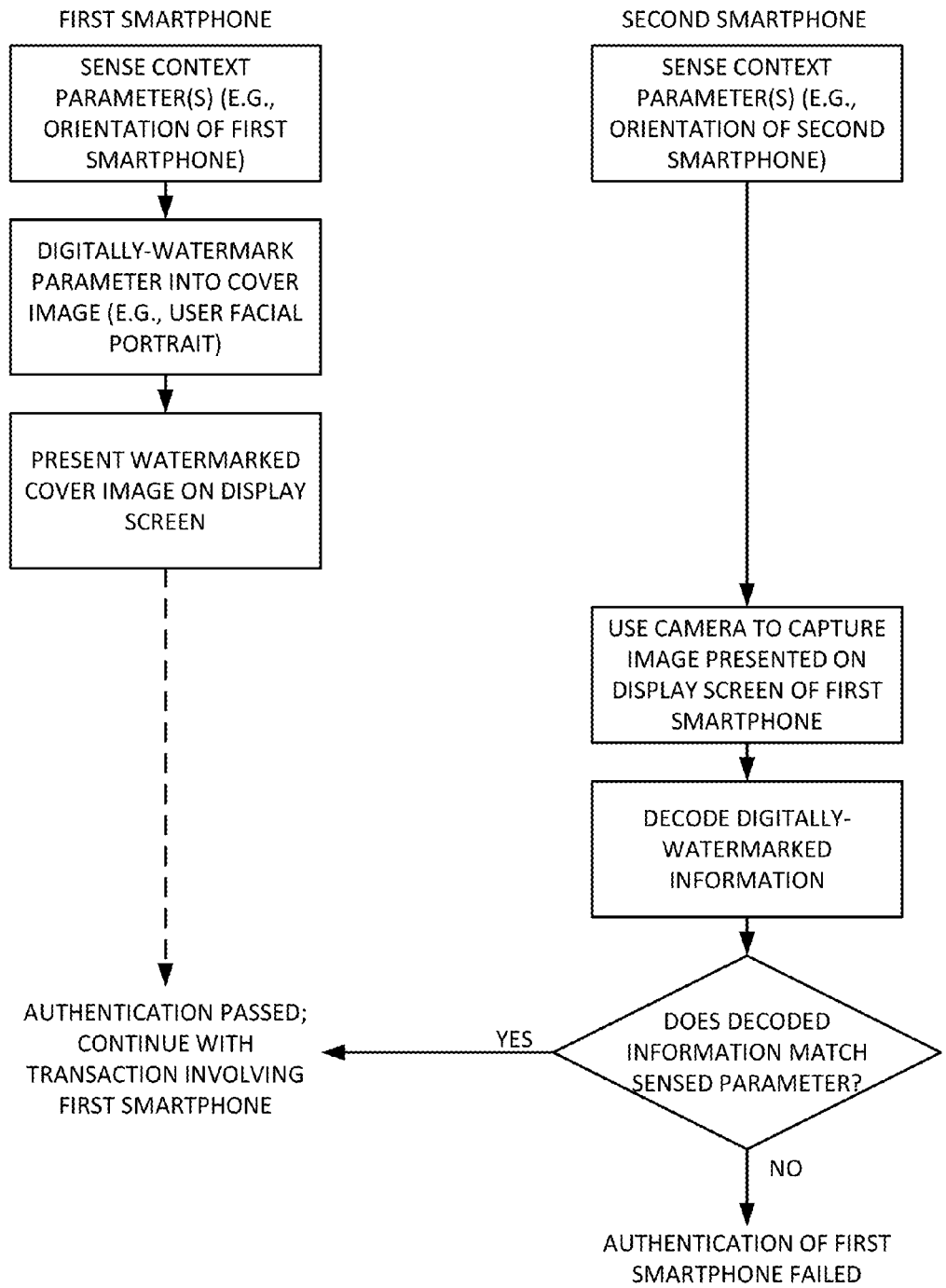
FIG. 2 is a flow chart showing one particular method of authenticating one smartphone to another.

FIG. 2 illustrates a particular embodiment of such a method. In this example, the first smartphone uses the context parameter of phone orientation (which may be expressed as three values, corresponding to the three axes of the smartphone). These three data are digitally watermarked (steganographically encoded) into a "cover image," such as a facial portrait of the user of the first smartphone. The watermarked image is then displayed on the screen of the first smartphone.

The user of a second smartphone positions the second smartphone parallel to the first smartphone, and captures an image of the portrait displayed on the first smartphone screen. Being roughly parallel, the orientation sensors in the second phone should indicate an orientation that corresponds to data output by the orientation sensors in the first phone. E.g., if the first phone is held so that it "points" north, and is screen-up, with its right edge tipped down 15 degrees, the second phone should report corresponding orientation parameters.

("Correspondence" between parameters depends on the configuration of the second phone. If the second phone is imaging the first using a camera lens on the "back" side of the second phone, the parameters should match. However, if the second phone is using a camera lens on the "front," next to the second phone's screen, the two phones then have reciprocal poses. That is, while the tops of the phones are both pointed north, the second phone is screen-down (vs. face-up), and its left edge tips down 15 degrees (vs. right edge tips down 15 degrees).)

The second phone decodes the digital watermark that was earlier encoded into the screen display by the first smartphone. By so-doing, the second smartphone extracts the orientation information reported by the first smartphone. The second smartphone then checks that the orientation information extracted from the watermark encoded by the first phone corresponds in an expected manner with the orientation information that its own sensors report (within some threshold range of tolerance). If the two sets of data correspond, this tends to confirm that the second smartphone is dealing with a first smartphone that is truthfully reporting its present context. This is some evidence that the first smartphone is trustworthy and is not, e.g., simply replaying recorded context information.

If, in contrast, the orientation information that the second smartphone extracts from the first phone's digital watermark does not correctly correspond to the orientation information that its own sensors report, this is regarded as a failure by the first phone to authenticate itself.

While the just-discussed arrangement was based on three context parameters (i.e., orientation in three dimensions), the same process can be performed with one or two context parameters, or more than three parameters.

Figure 3:
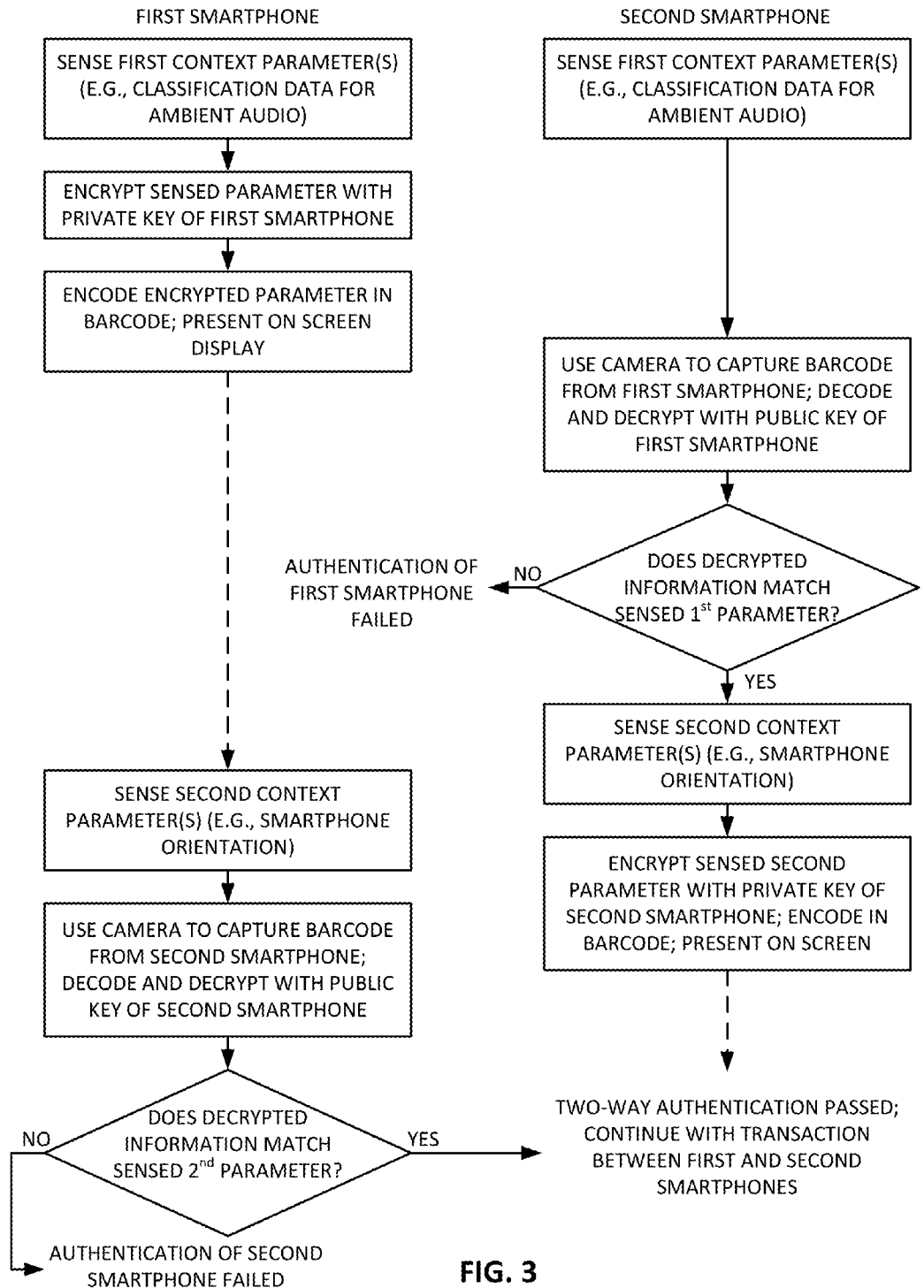
FIG. 3 is a flow chart showing one particular method of authenticating two smartphones to each other.

FIG. 3 details a process similar to that just-discussed, but detailing two-way authentication—in which the each smartphone tests the other.

In this arrangement, the first smartphone uses information from a logical sensor: an audio classifier. This audio classification data is encrypted using a private key of the first smartphone. The resulting information is encoded in 2D barcode form, and presented on the screen of the first smartphone.

The second smartphone polls its own audio classifier to characterize the ambient audio environment. Before, or after, it also captures imagery of the barcode presented on the screen of the first smartphone, and decodes this barcode to retrieve the encrypted data thereby conveyed. The second smartphone applies the public key of the first smartphone to retrieve the audio classification data reported by the first smartphone.

The second smartphone then compares the two audio classification data for correspondence. If they don't match within a suitable error tolerance, authentication of the first smartphone has failed.

Assuming the two reports of audio classification data agree, the second phone then repeats the process—now authenticating itself to the first smartphone. In this phase of operation it senses its own orientation (e.g., in three dimensions, as described above). The second phone encrypts this orientation information with its own private key, and encodes the result in a barcode, and presents it on the second smartphone screen.

The first smartphone engages in a parallel operation. The first smartphone is positioned parallel to the second phone and captures an image from its screen display. The 2D barcode depicted in the captured image is decoded, and the first phone then employs the public key of the second phone to decrypt the decoded information. The recovered 3D pose information about the second smartphone is then compared with information about the pose of the first smartphone. If the two sets of orientation information agree, the second phone has been authenticated to the first.

Figure 4:
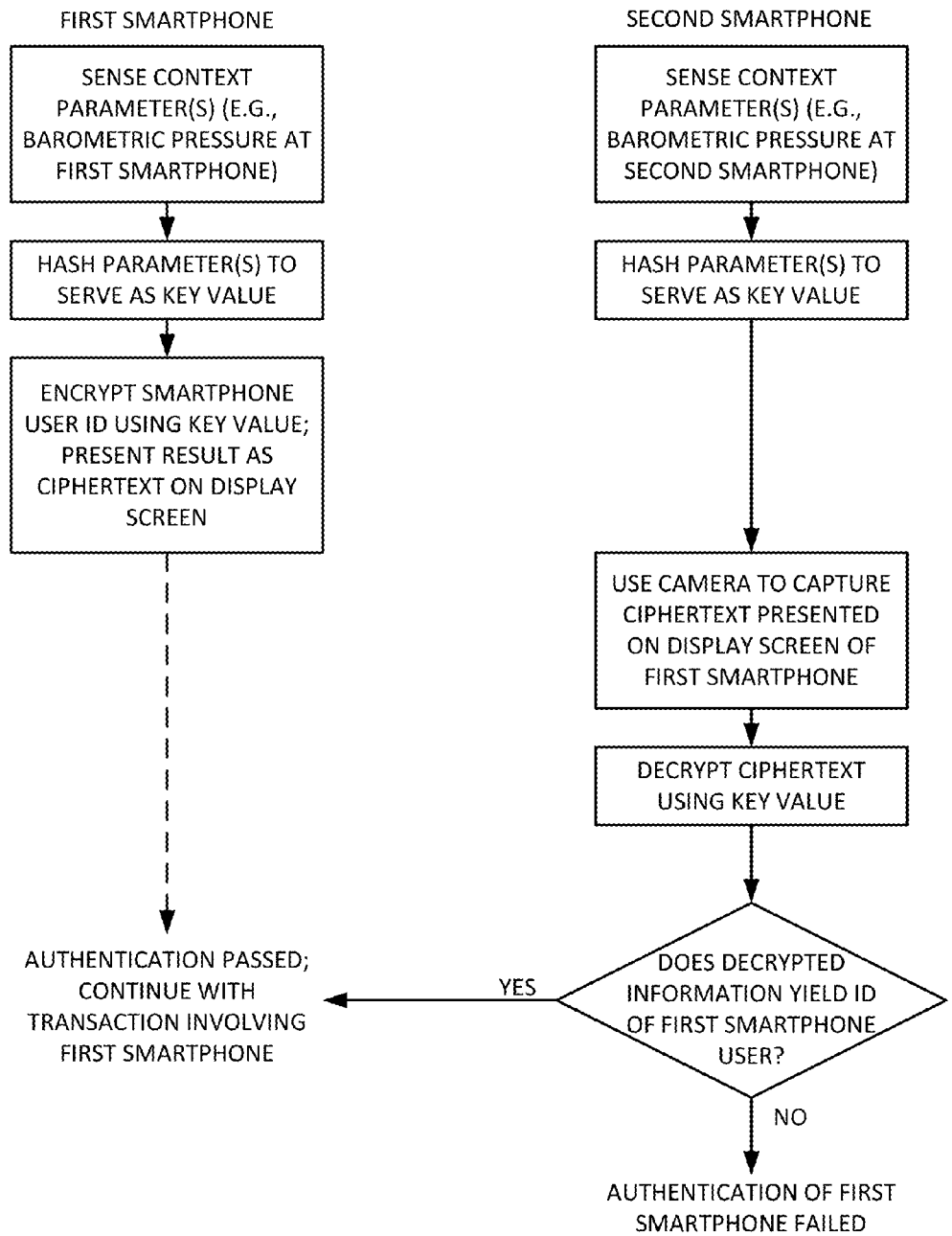
FIG. 4 is a flow chart showing another particular method of authenticating one smartphone to another.

FIG. 4 shows another implementation. In this arrangement the first smartphone senses the barometric pressure. It then applies a hashing operation to this pressure data to yield a key value. (So-called "fuzzy" or "robust" hashing is used, in which slight differences in the input data still yield the same hash value.)

The hash value is then applied as an encryption key to information specific to the first user, such as a user ID string (e.g., 10-digit telephone number, or email address, or Bluetooth name). The resulting string is presented in textual form (ciphertext) on the display screen of the first phone.

The second phone, in turn, performs a parallel operation—querying its own barometric sensor, and applying the same hashing operation to yield the same key value. Using its camera, the second phone then images the text presented on the screen of the first phone, and applies an optical character recognition (OCR) operation to yield ASCII characters. This text string is decrypted using the just-computed hash as a decryption key. The decrypted text is then compared against its expected value (e.g., the first user's ID).

The second phone then proceeds with a transaction involving the first smartphone, or not, based on the result of this comparison.

Figure 5:
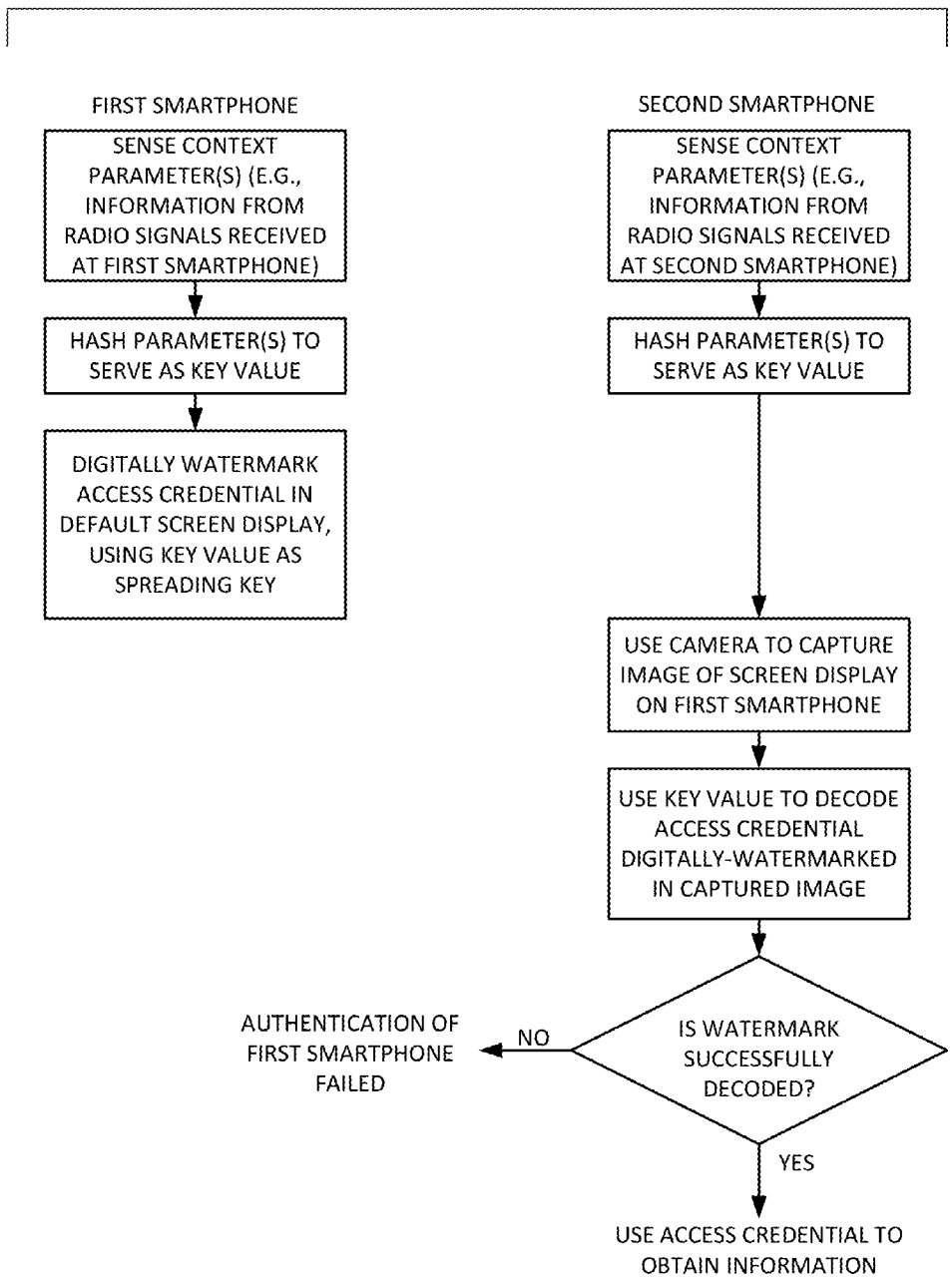
FIG. 5 is a flow chart showing one particular method of securely providing an access credential from a first smartphone to a second smartphone.

FIG. 5 shows yet another implementation. This embodiment uses radio signals sensed by the two phones as context data. The actual data used may be, e.g., the SSID of the strongest WiFi network detected by the phones, or the WiFi channel of the strongest network detected by the phones, or an identifier reported by a nearby RFID chip (aka near field chip, NFC), or other data received wirelessly by the phones, or derived from such data.

As in the FIG. 4 arrangement, this context value is hashed by a robust/fuzzy hash operation. Instead of being used as a text cipher key, however, the output of this hash process is used as a spreading key for a spread spectrum image watermarking method. That is, the key defines where, or how, watermark payload data is to be encoded into host imagery.

The host image can be arbitrary. In the detailed embodiment it is the default screen displayed by the first smartphone (e.g., an app display, or a desktop display). This imagery is digitally watermarked, using the spreading key, to convey an access credential. This access credential is information that can be used by a recipient to gain access to information relating to the first smartphone (or the first smartphone user).

For example, the encoded credential data may be a password that enables access to a website or other online repository where information about the first user (e.g., contact information) is stored. Or it may be a URL or other address identifier, indicating a location from which information about the first user can be obtained (e.g., published calendar data for the first user).

The second phone independently obtains corresponding radio signal information, and hashes it to yield a spreading key for a digital watermark process. The second phone captures imagery from the screen of the first phone, and then uses the key to attempt to decode the access credential information.

The second phone checks whether the watermark decoding operation was successful (e.g., by CRC or other error checking test). If successful, the second phone uses the decoded access credential to obtain information. If the watermark was not successfully decoded, this indicates an incorrect spreading key was used in decoding, indicating that authentication of the first smartphone failed.

(Although not shown in FIGS. 4 and 5, the detailed process can be extended to a two-way authentication process, e.g., following the model of FIG. 3.)

Head-Mounted Display Systems, and Related Technology

As head-mounted display systems (HMDs) proliferate (such as the Google Glass product), new issues and opportunities arise.

Figure 6:
FIG. 6 depicts a wearable computer system.

A HMD may include one or more sensors, such as cameras, microphones, and accelerometers. A HMD may also include sensors for detecting electrical or magnetic activity from or near the face and scalp (such as EEG and EMG, and myoelectric signals—sometimes termed Brain Computer Interfaces, or BCIs), etc. The system can also include other of the elements shown in FIG. 1. The display and some (or all) of the other system components can be provided as part of the head-worn apparatus. Alternatively, some components can be provided elsewhere (e.g., a smartphone in the user's pocket, a computer in the cloud, etc.), and wirelessly linked to the headworn apparatus. An illustrative HMD 60 (a Google Glass prototype), including a microphone 62, a camera 64 and a display 66, in communication with a smartphone 68, is shown in FIG. 6. (Other HMDs are detailed in references cited below.)

The camera(s) in the headworn apparatus may be outward facing, and/or oriented towards the wearer's eyes and face.

Although certain head-worn devices may include buttons for user-interface purposes, it would be preferable not to use such buttons for most tasks.

One task is sharing information. Consider Alice and Bob, both wearing HMDs at work, and chatting at the water cooler. Alice mentions an interesting journal article about self-driving cars she recently read online. Bob asks Alice to send him a link to the article, and Alice agrees.

As they were chatting, Alice's HMD detected that someone was speaking with Alice. Alice's HMD identified her own speech by its strong amplitude and its spectral characteristics. (The HMD has an extensive history of sensing Alice's audio, so it is straightforward to recognize her voice.) A self-directed camera on Alice's HMD may also provide video imagery showing movement of her cheek and/or lips in synchrony with the audio—providing an independent indication that certain of the sensed speech is Alice's. (Indeed, the HMD system could discern the contents of Alice's speech by lip-reading alone—irrespective of audio.)

The HMD system discerned that someone is in dialog with Alice by the back-and-forth nature of their audio. (Alice speaks, then a responsive sound is heard, etc.) From a library of familiar voice models, Alice's HMD recognizes the other person as Bob.

In identifying Bob, Alice's HMD may rely, in part, on geolocation data to narrow the universe of possible speakers. Since Alice is at work, voice models for her co-workers (e.g., stored in the cloud) are checked for a match. Additionally or alternatively, a forward-facing camera may capture imagery of Bob. Known facial recognition techniques serve to identify Bob. (Again, the location context serves to narrow the field of possibilities.) The fact that the imagery shows that Bob's lips and facial expressions are changing in synchrony with the other person's sensed speech, helps confirm that Bob is the speaker with whom Alice is in dialog. Still further evidence of Bob's identity may be sensed wirelessly, e.g., by smartphone, Bluetooth, Zigbee, WiFi, NFC, etc., emissions, which Alice's HMD system can receive and identify using stored reference identification data (e.g., in a networked data store).

Having identified Bob, Alice's HMD presents a dossier of potentially helpful information on a display for Alice to view. This includes a reference image, profile information that Bob makes available to Alice, a synopsis of recent email (and spoken) communications between Alice and Bob, calendar information, etc. Initially, none of this information is particularly noteworthy, so Alice's HMD displays the data in a default font (e.g., faint grey)—typically used for such background information.

During the course of their chat, Alice's HMD is understanding the meaning of the spoken dialog—possibly storing a transcription for a day or a week (after which time it may be gracefully decayed). But it is primarily listening for spoken contextual clues signaling information that may be useful to Alice.

The HMD searches data in an archive (local, and/or in the cloud) for historical information that might relate to the current discussion, so that it can present same on Alice's display. When it hears the reference to a recently-read article about "self-driving cars" it finds a cached version of an online article that Alice was reading yesterday—and determines that it is relevant to the dialog. The HMD displays a citation to the paper on Alice's display. Because the reference matches the description given by Alice, the HMD discerns that it is potentially material to the dialog, so renders the citation with a more prominent presentation than the background information earlier mentioned, e.g., in a larger font, or a distinctive color or typeface. The display (which serves as a virtual read/write whiteboard for Alice's visual use) may have a featured area for higher priority items—such as on a top of a list, or at the center of the display; the citation (and/or an image of the first page of the article) appears at such location.

By recognizing the speech of the dialog, and from semantic interpretation of its meaning, Alice's HMD understands that Alice has agreed to provide Bob a link to the paper. The HMD undertakes many actions without obtaining express approval of Alice. However, where an action involves communicating with another individual, rule data in a stored set of rules dictates that the HMD not take such action unless a confidence model indicates a 99+% certainty that the contemplated action is one of which Alice would approve. In the present case, the calculated confidence falls short of this threshold (e.g., because Alice read several papers about self-driving cars ten days ago, and her reference to reading a paper "recently" is ambiguous). Thus, her HMD seeks Alice's confirmation before sending Bob the link.

To solicit confirmation, Alice's HMD presents a text query on the display screen, e.g., "Send the link to this article to Bob?" (The query can optionally provide more information, such as the title of the article, or its URL.) Depending on the type of HMD display, this query may appear—to Alice—to float in her field of view.

There are other ways to indicate to Alice that a response has been requested by the HMD. An aural prompt can made by the HMD, using speakers or other transducers near Alice's ear(s). The prompt might simply be an alerting beep tone, in conjunction with a text prompt. The HMD may alternatively use speech to ask Alice the question "Send the link to this article to Bob?"

Haptics are another way for the headset to call Alice's attention to a prompt.

Alice signals her assent, such as by letting her gaze linger on the HMD's displayed query for at least 1.3 seconds (a threshold interval of time, set by Alice). This action can be sensed by a face-sensing camera on her head-worn display (optionally with infrared illumination), in conjunction with eye tracking (e.g., corneal, pupil or retinal tracking) software.

Another approach for collecting Alice's response uses the same eye tracking mechanism, with two buttons floating in the field of view for her to focus on—Yes or No. Other feedback mechanisms can also be used. These include a double blink for a yes, or other facial movements that can be sensed by the HMD, such as a subtle facial move. These can be captured with a camera on the HMD, or by electrical stimulus—including use of a Brain Computer Interface. (Commercially available BCIs include the BrainGate from Cyberkinetics, the MindSet from Neurosky, and the EPOC neuroheadset from Emotiv.)

Another UI feedback paradigm—useful with binocular HMDs—relies on sensing the focal plane at which Alice's vision is focused (again by use of retinal, pupil or corneal tracking). If one visual prompt is presented to apparently float at a great visual distance from Alice (e.g., infinity), and another appears to float just six inches in front of her face, Alice's selection can be discerned from sensing at which of the two focal planes her eyes stereoscopically focus and dwell (or focus and then blink).

Such arrangement mitigates a problem with see-through HMDs: when in conversation with another person, a user's eyes may divert from looking at the person, and instead look toward something of interest presented in another part of the display. This betrays the user's distraction. Better is for certain visual prompts to be overlaid in the same visual direction as the user's current gaze, but at infinity. The user can read such prompts by letting the eyes refocus at infinity—without changing their direction. This is less disconcerting to the person with whom the user is speaking (if it is even noticed at all), and enhances continuity of the human-human dialog.

In one implementation, a "Yes" response is always presented to appear in one focal plane (e.g., infinity), and a "No" response always appear in the other (e.g., near, such as 6 inches to 20 feet). In another implementation, the response that is determined by the system to be most likely (e.g., based on historical experience, and the current context) is always in one focal plane (e.g., a near focal plane), and the response judged less probable is always at the second focal plane (e.g., infinity).

(Other implementations can present more than two options, by indicia presented at more than two apparent focal depths.)

Alice's HMD may use standardized user interface conventions by which she can share, read, or print any document. Thus, even without a displayed query asking whether a link to the document should be sent to Bob (prompted by recognition of Alice's spoken dialog with Bob), Alice can summon a contextual menu by letting her gaze linger on a displayed object (e.g., a link or document) for the threshold interval of time. This menu presents options suitable to the context, e.g., asking whether she wants to read, print or share—posed as three displayed textual prompts. Again, Alice lets her gaze linger on a desired selection for the threshold interval of time, to effect a choice. If a further selection is needed (e.g., share with who?), further text options are presented, for user selection. In the sharing case, the list of recipients is contextually ordered, e.g., with the person(s) with whom Alice is in dialog at the moment at the top of the list.

Alice's HMD can identify Bob's network address in various ways. One is by use of his recognized face or voice. A table, or other data structure on the company network, may store data associating faces/voices/etc. with their corresponding network addresses. Another approach is for Bob (and others) to broadcast their network addresses to others, such as by short-range wireless (e.g., Zigbee, Bluetooth), or by a service discovery protocol, such as Multicast DNS, or Apple's Bonjour.

By such arrangements, Alice's HMD can send the requested link about the self-driving car article to Bob. But Bob may want assurance that the data really came from Alice. Moreover, Bob's HMD may have a filtering system, e.g., to assure that spam, viruses, and other unsolicited data isn't presented on Bob's display.

So instead of accepting data packets sent from Alice's HMD, Bob's HMD responds to Alice's transmission by requesting verification. The two systems negotiate to determine which verification technique to use (e.g., Alice's HMD sends data indicating the verification protocols enabled on her system, and Bob's HMD responds by selecting one that is enabled on his system). The selected verification protocol may be based on shared context. Any of the arrangements detailed elsewhere in this specification can be used. An exemplary one is based on the audio environment. Alice's HMD processes ambient audio and sends resulting data to Bob's HMD. Bob's HMD does likewise. Each system checks the data received from the other, to confirm expected correspondence with the common audio environment.

Once the two systems have authenticated themselves in this manner, Alice's HMD sends the requested article link to Bob's HMD. Known secure protocols, such as HTTPS and digital signature technology, can be used. Desirably, however, no such action is taken until each device is certain that it is communicating with another device in a common-context environment.

As suggested, establishing trust will be a primary concern with HMDs. Throughout their dialog, Alice's HMD can be analyzing expressions on Bob's face, modeling the expressions and the sensed audio to evaluate the statistical probability that the expressions appear consistent with the audio speech sensed by the microphone in Alice's HMD. (Alice wants to guard against being spoofed by a recording of Bob's voice, with which the speaker's mimed expressions do not accurately correspond.)

To further aid in establishing trust, Bob's headworn apparatus may sample his EEG (or other biometric), and broadcast or otherwise provide corresponding data to Alice's HMD (e.g., via Bonjour, HTTPs, etc.). Electrical impulses associated with movement of Bob's mouth and other facial muscles are reflected in the EEG data sent to Alice. Alice can use this data as another cross-check against data independently sensed by Alice's HMD sensors (e.g., imagery depicting Bob's facial movements, and audio reflecting his audio speech). If Alice's HMD discerns a discrepancy in correspondence between the received biometric signals, and data her HMD senses from Bob, then something is amiss, and corresponding defensive action can be taken.

Similarly, Bob's HMD can broadcast or otherwise provide data based on imagery from a self-facing camera, evidencing his facial expression, movement of lips and facial muscles, affect, etc. Likewise with other data sensed from Bob by Bob's HMD (e.g., audio). These data, too, can be used by Alice's HMD to enhance trust.

In a particular scenario, Bob' HMD senses his own facial affect, and transmits corresponding information to Alice's HMD. Separately, Alice's HMD assesses Bob's facial affect from its own imagery. Her own affect assessment is compared with that received from Bob's HMD for consistency. (Bob can similarly authenticate Alice, in reciprocal fashion.)

Another issue with HMDs is their use by children, and parental moderation of such use.

One approach is to mediate the reality presented by HMDs. Through object recognition, visual overlays can obscure items that parents do not wish their children to encounter—in the physical or virtual world. (Adults, too, may choose to use such technology.)

Consider racy signage featuring a Calvin Klein model in Times Square. Imagery captured from the sign is machine-recognized/classified and found to depict a male figure, with legs and chest bare. A HMD through which this scene is viewed can augment the captured imagery with an overlay that obscures (or clothes) the model's body.

In addition to simply recognizing (classifying) objects in real or virtual imagery, such technology can also recognize actions, such as use of guns, or kissing. These, too, may be edited-out of imagery presented to the HMD user.

Different social groups, with different sensitivities, can use HMDs that are configured to mediate content in different ways. One line of HMDs may be designed to conform to Sharia law—shielding users from viewing exposed skin and public depictions of kissing. Another line may be branded by Disney and visually adapt imagery to—essentially—a "G"

rating, omitting or obscuring items/actions unsuitable for small children. Different organizations (Disney, the Islamic Sharia Council, etc.) may endorse different lines of HMDs, with different types of interventions.

While described in the context of visual imagery, audio can also be edited to reflect values or preferences of the listeners. (Some HMDs are configured so that no visual stimulus reaches the viewer except through the HMD system. HMDs do not typically process sound stimulus in such a comprehensive manner. However, it would be straightforward to do so, with earphones or earpieces that block sounds except those delivered by the system.)

In both visual- and audio-content mediation, there may be some delay entailed in recognizing the content, and taking any necessary action. In the case of HMDs that perform both visual- and audio-content mediation, the audio is typically the controlling factor in the delay. For example, audio mediation that replaces or omits curse words needs to wait until an utterance is completed before concluding that it is objectionable. In such systems, presentation of the video on the HMD display is delayed by an interval of time greater than required for visual mediation—to allow adequate time for audio mediation, and maintain synchrony between the mediated audio and video.

In other cases, such a delay is not required. In television, for example, the HMD can identify the displayed content through use of watermark of fingerprint techniques. Knowing the identity of the content, the HMD can query an online database, where the broadcaster or content producer has made available data identifying excerpts of possible concern. (The television station may populate such database in real-time, e.g., by audio recognition of curse words, from a feed of the content ahead of the usual seven second broadcast delay.) By such arrangement, the HMD can essentially look into the future and anticipate action that will be required, allowing editing in real-time, as the audio or visual content is rendered.

Content delivered by so-called "Over the Top" streaming models, such as Netflix and YouTube, can be handled similarly. Again, the HMD can identify the content, and check an online repository detailing upcoming elements of the content. Corresponding action (e.g., obscuring or modifying the content) can then be taken.

As an example, consider a family sitting down to watch a movie, which the parents believe—based on the coarse rating system provided by the MPAA—that that the PG content is going to be acceptable for their 8 and 12 year old children. As the movie starts, however, several short scenes occur that cause the parents to realize that the movie isn't appropriate for their 8 year-old. Instead of turning the movie off, or sending the youngster out of the room, other options exist. These include obscuring or modifying the visual or aural content for that child's HMD alone. These modifications can include dynamically editing the time-scale of the content. For audio, using known pitch invariant scaling techniques, and ambient noise suppression, the HMD can effectively skip a brief 0.5 second utterance, and stretch the audio before and after the utterance to seamlessly remove it for the child. Similar techniques are suitable for use with imagery, such as using image segmentation, compressed sensing, etc. (An example of such image-altering technology is the Content Aware Scaling feature in Adobe Photoshop software.)

While described in the context of HMDs, it will be recognized that such technology can also mediate other content delivery systems, such as televisions and music players.

By such arrangements, different consumers experience different parallel universes. A gluten-intolerant consumer viewing a menu signboard at McDonalds sees it rendered in the HMD display without items containing gluten. A lactose-intolerant consumer viewing the same menu sees it differently—omitting items containing lactose. A subscriber to the WeightWatcher HMD service sees still a different selection—showing only items acceptable to the WeightWatcher's diet plan. The WeightWatchers-configured HMD also prominently displays the WeightWatcher point count for each remaining item, as conspicuous graphical overlays.

In each of these cases, the different consumers' HMDs all captured imagery from the same, unabridged, menu signboard. But each altered the rendered signage differently. (The original signboard descriptions were all recognized by the HMDs using OCR; corresponding nutritional information for each was then determined from an online database; and imagery presented to the consumer was altered accordingly.)

Different consumers can thus configure their own content mediations based on social affiliations and personal preferences; reality is experienced with a user-selected editorial voice.

Users may also decide to switch mediation modes/personas to experience the world in different ways, at different times (e.g., akin to "Private Browsing" modalities found in many web browsers, which some users periodically employ). In the private browsing construct, no history, state, etc. are stored.

Increasingly, consumers will be presented with electronic augmentations via HMDs. A QR code on a sign at a bus stop may cause a user's HMD to superimpose an advertising video in that region of the user's field of view. Shazam-like recognition of a song may cause a user's HMD to display a corresponding music video in a corner of the display. These responses are programmed by others (typically marketers), and may conflict with user desires or values.

Again, such electronic augmentations are identified by known content recognition/classification technologies, and are edited/blocked in accordance with user preferences. If a seven year old child curiously interacts with a QR code found on a telephone pole, and the interaction results in imagery of a Victoria's Secret model being transmitted to the child's HMD for presentation in a corner of the display, the child's Sesame Street-branded HMD can respond by instead presenting a tutorial video at that display location, reminding the child that 6+6 is 12, and 7+7 is 14.

Rather than mediate content after it is received, another aspect of the present technology concerns alerting users of content that may be encountered in particular environments.

Just as motion picture ratings "G," "PG," "PG-13," etc., alert viewers as to content of movies, so too may environments have ratings. These can take the form of machine-sensible data (e.g., visible indicia, audio or wireless signals) at certain venues, signaling the type of content that may be encountered in that venue.

Consider a store in a mall. A QR code at the entrance to the store, or a subliminal noise-like audio track, may signal information to HMDs and other devices about the particular content encountered inside. Is there violence? Allusion to drug use? Graphical display of sensuality? Foul language? Depictions of smoking? Crude humor? Etc? A parent may configure a teen's HMD to be alert to such descriptors, and provide textual or auditory instruction to the child (e.g., "Don't go in there"). If the child enters the space, the HMD may be configured to send an email, text message, or other communication to the parent advising of the conduct, or simply log the action in a data store for later parental review.

The environment may also transmit to the HMD fingerprint data, or other content recognition/classification aids, by which the HMD might more easily discern different types of content in the venue (e.g., here is a file containing robust visual features by which an image of a person smoking a cigarette, displayed inside the store, can be recognized). Such information can be cached in the HMD, and checked ahead of other data in trying to identify content by image fingerprinting. Being alert to the particular content hazards, the HMD can more quickly and accurately respond by blocking or editing such content in the information rendered by the HMD to the teen.

Just as machine-sensible signals can alert a HMD about content that may be encountered, such signals can also instruct a HMD about actions that should be taken (or not taken).

Consider facial recognition. This operation may be a background operation universally performed by most HMDs. Facial recognition algorithms are becoming evermore accurate, and sources of reference facial imagery from which such algorithms can make matches are becoming more widespread. Some people, however, may object to such omnipresent distributed surveillance, and want to opt-out.

Instead of wearing a ski mask or other disguise, such a person (Carol) can wear a visible badge, or her HMD or other device can emit acoustic or radio signals, signaling to other HMDs that she does not wish to be recorded or recognized. Compliant HMDs worn by others (e.g., Dave) detect such signal and respond accordingly, e.g., by disabling data collection (imagery and audio) from Carol, and disabling associated facial recognition and speech recognition.

Commonly, the face of the opting-out person can be located, within a camera's field of view, by reference to the detected origin of the opt-out signal. If the signal is a badge worn by Carol, image segmentation techniques (e.g., region-growing) can quickly locate her face. This corresponding region in the field of view of the image sensor in Dave's HMD can be disregarded—its data not stored (other than ancillary to tracking Carol's face as it may move in the image field). Or imagery corresponding to the facial region may be blurred to make it unrecognizable. Thus, no facial recognition can occur. If the opt-out signal is acoustic or wireless, beam-forming techniques can be used (e.g., employing multiple microphones/antennas) to generally localize the source of the signal. The face closest to this source is determined to be the one that should be omitted/obscured from recorded data.

Similarly with speech. Opting-out-Carol is again located, relative to Dave's HMD, by a technique such as image segmentation or audio/wireless beam-based localization. A sensing microphone array in Dave's HMD can then be configured (e.g., by phasing) to place a null in Carol's direction, so that audio from Carol is relatively attenuated. Alternatively, imagery from Carol can be analyzed for purposes of sensing her facial movements corresponding to speech. Audio sensed by Dave's HMD microphone is analyzed for temporal correlation with these sensed facial movements, and audio that corresponds to the facial movements is attenuated to prevent its recognition. In still another arrangement, whenever opting-out-Carol is sensed to be speaking (e.g., by reference to sensed facial movements), the microphone of Dave's HMD is momentarily disabled.

Carol can be identified in other ways, too. One example is by identifying wireless emissions—such as by a telephone device. Or Bluetooth, or NFC. Etc. Once identified, other information becomes meaningful, like the location at which she was identified. Again, Dave's HMD is respectful of her privacy desires. If he establishes a Bluetooth connection with Carol, or senses other distinguishing attribute permitting her identification, receipt of the Carol's opt-out signal causes his HMD not to log certain details of the transaction—such as data identifying the geolocation at which the encounter took place.

It will be recognized that the foregoing arrangements have philosophical kinship with the robot.txt standard, by which web sites can signal to Google, and other search engines that crawl the web, that they don't want their content indexed and made available for search.

Another aspect of the technology concerns aiding Alice's hearing of Bob, e.g., in a noisy environment. Having segmented Bob's speech from the background noise (e.g., using multiple microphones on the front bezel of the HMD, or the three microphones on the Apple iPhone 5 device), in conjunction with beamforming, Alice's HMD can augment Bob's voice and suppress the background noise by subtly amplifying his voice through speakers near Alice's ears. The same speakers can simultaneously play a noise suppression signal tailored to the environment (as is familiar from noise cancelling headsets—such as by Bose and others).

Still another aspect of the present technology is to enhance cross-cultural communication. In some cultures, saying "no," and otherwise expressing disagreement, is awkward or taboo. Thus, many cross-cultural dialogs are made difficult, because one party may be looking for a yes/no answer, and the other party—thinking "no," won't say "yes" and is bound—out of respect—not to say "no." Facial expressions and tone of voice can provide clues to communications that sometimes aren't explicitly expressed. Systems in which a camera senses facial expressions, and/or in which a camera senses voice tone, can be trained (as detailed elsewhere) to discern emotion or meaning that is being expressed by a person, but just not in literal words.

Relatedly, a user's own HMD can adapt its operation in accordance with the user's sensed facial affect/mood, or other biometrically-sensed signal. For example, if Bob is discerned—by his HMD—to be focused or concerned (e.g., concentrating while writing software, or engaged in an intense dialog with his wife), his HMD may modify its behavior.

Some modifications concern how the HMD interacts with Bob. For example, a chime that normally sounds when email arrives, may be disabled or made quieter. Social network updates that occasionally appear on Bob's display may be repositioned more towards the periphery of his field of view, or rendered in duller colors and/or with smaller font. Text news feeds that Bob hasn't paid much time with, historically, may be suppressed.

Other modifications concern how the HMD interacts with others. Bob's HMD may become a bit more isolationist in the digital realm. It may stop broadcasting Bob's IP address, and suspend other non-essential transmissions to others (e.g., by zeroconf or Multicast DNS). Moreover, it may reject inbound inquiries from other systems for information, and decline invitations to participate in collaborative transactions with nearby devices.

Proactive queries that Bob's HMD usually sends to Google, allowing the HMD to present to Bob information relevant to presently-sensed audio, imagery, or other context, may similarly be suspended, or scaled-back in number, or filtered so that only particularly salient queries are sent.

Another aspect of the present technology concerns sensing asymmetric personal relationships, and acting accordingly. This often involves use of social network data.

Consider two people who are about to engage in a transaction—perhaps akin to Alice and Bob's encounter. This time, however, they are not peers. Instead, they are Professor and Student. Professor has a higher social rank than Student, and this is reflected in online data sources. For example, such information can be harvested indicating that Professor received his PhD in Esoteric Biology from Harvard in 1972, and has been a Regents Professor in the Biology Department of State University since 1986. In contrast, similar data about Student indicates that he is an unemployed undergraduate student in the Biology Department of State University.

Social network graph data from Facebook and LinkedIn shows that Professor has strong links (e.g., many interactions) with other academic superstars, whereas Student's strongest ties are to underachievers who work at the neighborhood video store. This graph data may further show that Student has mentioned Professor in several Facebook posts, but Professor has never similarly mentioned Student. Moreover, the graph data may show that Student sent two messages to Professor, asking for a draft of a journal article the Professor is writing, but that Professor never replied to Student.

Public records data may show that Professor lives in Upscale Acres, on a 5 acre parcel having a tax valuation of a million dollars. An online records search to learn about Student's residence only shows that his credit history was checked six months ago by LowRentApartments, Inc.

From such information, an automated system concludes there is a status disparity between Professor and Student. This disparity can influence their electronic interaction.

In particular, consider Student encountering Professor on a University sidewalk. Each is wearing a HMD. Student asks Professor for a copy of the draft journal article. An electronic transaction process ensues—akin to that earlier detailed between Alice and Bob. However, due to their disparity, the HMDs of Professor and Student negotiate a different authentication protocol. In particular, Professor's HMD insists on draconian terms from Student, requiring extraordinary effort by Student (or Student's HMD) to comply. Normally, Student's HMD would spurn such arrogance and refuse. But having assessed and understood their disparate status relationships from the online data, Student's HMD decides compliance is prudent, and performs all the rituals required by Professor's HMD.

The required rituals may include, e.g., multiple familiar authentication techniques, such as repeated challenge-response tests, two-factor authentication, etc. Professor's HMD may also require that Student's HMD submit something of value (including information) to escrow. The escrow terms may entitle Professor to claim or otherwise have rights (e.g., redistribution rights) to the escrow deposit if Student fails to fulfill certain requirements of their transaction (such as Student's violation of an agreement not to redistribute the draft journal article).

Student's HMD is set to normally require fairly strict authentication before engaging in transactions outside family and close friends. But given the present context, Student's HMD requests a lesser degree of authentication of Professor. Professor's HMD declines Student's modest authentication request. Rather than abandon the transaction, Student's HMD further relaxes its security requirements, deciding to continue the transaction without requiring any authentication effort by Professor's HMD—based on the information gleaned from the online sources. Student's only comfort is that data received from Professor will be subjected to virus checking before it is accessed.

In like fashion, any two systems—as proxies for their respective users—can adapt their modes of interaction in accordance with status information gleaned from social networks and other online data repositories. If one system is found to be relatively subservient to the other (e.g., in a social hierarchy), a disparity in standards may apply. Thus, digital devices understand the social context of users, and behave accordingly.

(Online services dedicated to ranking people's social status—so-called social media analytic services—are growing in popularity. Klout<dot>com is one. It analyzes social network data to measure a person's social influence, and identify the particular topical domains in which a person has influence.)

Other Remarks

The presently-detailed technology is well suited for use in conjunction with other of the applicant's mobile-, context-, and social network-based technologies. These are detailed, e.g., in patent publications 20110212717, 20110161076, 20100119208, 20100205628, 20100228632, 20110159921, and 20120134548, and in applications Ser. No. 13/571,049, filed Aug. 9, 2012 (now U.S. Pat. Nos. 9,223,893), 13/572,873, filed Aug. 13, 2012 (published as 20120311623), and Ser. No. 13/607,095, filed Sep. 7, 2012 (now U.S. Pat. No. 9,196,028).

Having described and illustrated the principles of my work with reference to a few examples, it should be recognized that the technology is not so limited.

For example, while described in the context of authenticating one smartphone (or HMD) to another, the technology has a great variety of other uses.

Consider, for example, social network "friending," such as on Facebook or LinkedIn. A user may elect to automatically friend other individuals with similar interests and/or demographics, who share aspects of current or historical context.

A particular example is a user who attends a lecture on a specialized topic (e.g., the technological implications of calligraphy), at a university auditorium. The user may decide that anyone who attends such a specialized lecture, and is within a certain age range (or meets other demographic qualifier(s), such as shared membership in one or more organizations—as expressed by public profile data) would be an interesting social network friend. The user launches an app that allows demographic parameters of acceptable friends to be input, and then broadcasts friend requests to others in the auditorium. (The requests may be sent across the university network using the Bonjour protocol (Apple's implementation of Zeroconf—a service discovery protocol), or distributed using short range Bluetooth wireless, or by ad hoc wireless networking, or by NFC, etc.) Interested responders qualify themselves to accept the friend request, in part, by establishing their attendance at the same lecture, such as by computing an audio fingerprint of just-captured audio, and sending it back to the user. The user's app checks the history of recently-cached audio to confirm that the received fingerprint corresponds to audio that the user's smartphone also heard. After a responder has qualified himself/herself (at least in part) by being in the same acoustic context, the user's smartphone confirms the responder as a friend. (The exchanged information naturally conveys other information needed to establish the social network relationship, e.g., each user's respective name on the social network, etc.)

Such an app can similarly be configured to automatically accept friend requests issued by other individuals who are attending the lecture (again, optionally subject to specified demographic qualifiers).

Another use of the present technology is in context-fencing.

By way of background, geo-fencing refers to technology by which a user only receives certain messages or information when at certain geographies. For example, a user may write a shopping list that appears on the smartphone screen only when the user is near a grocery store.

In the broader context sense, a user may be presented with certain information only when certain context conditions are met. For example, a user may receive certain messages only when the user is with a particular person (e.g., identified by shared auditory or other context, or Bluetooth device pairing). Conversely, the system may be configured to not present certain messages when the user is with a particular person. Similarly, if the user is at a concert, and a certain song is played, this auditory context may cause the smartphone to deliver certain messages, or activate otherwise dormant features. Likewise if the user is viewing a particular video program: the presence of a certain audio track may cause the smartphone to enable one or more certain operations (e.g., message delivery) that are not otherwise enabled.

A great number of context scenarios can influence when or how messages are handled. Consider, in particular, scenarios in which watermark or fingerprint technology is used to identify ambient audio content.

One such arrangement provides ringback tones dependent on what television show the user is watching. In particular, the user's smartphone can set the ringback tone (i.e., the audible indication heard through the telephone by a caller while the phone they are calling is ringing) to the theme (intro song) of the show the user is watching—thereby clueing-in the caller about the user's context, even before the user answers the phone (or doesn't answer).

Another such arrangement sends an automated message (SMS/MMS) to a phone caller, stating that the user is busy at an AC/DC concert, and will call back soon. (As part of the message, the user might specify that related content also be included, e.g., concert poster, etc.)

Wearable computing arrangements can make telephone interruptions challenging, since the user doesn't have a physical control panel in-hand. This can be addressed, in part, by allowing the user's wearable computer to arbitrate who should be given attention—the person with whom the user is physically speaking, or a person seeking to establish electronic communication (e.g., by phone). In particular, the system can analyze the social status of the competing parties. (Their identities can be discerned by voice recognition methods, and other techniques described herein, and by caller ID methods.) If the person physically present with the user is found to be higher in rank, the system can respond to the electronic communication with a message reporting that the user is talking to someone right now, but will respond to their inquiry shortly. If the person physically present is determined to be lower in rank, the system may allow the phone to ring, or otherwise pass the communication to the user. (The user may specify exceptions to normal social status rankings, for example, giving the user's children a ranking higher than online sources might indicate.)

Many context-based actions can take place in automobiles. Various sensors can sense context, and stored rules can take action based on contextual circumstances. Consider a father who specifies that his new-driver teen daughter may not drive with friends in the car. The car's computer system may have a user interface allowing the father to specify a rule: if I am not present in the car, listen to the audio in the passenger compartment. Identify (where possible) the names of the speakers, and their number. Send me text message giving the names and number, if more than one voice is detected.

(The father's presence in the car is evidenced by Bluetooth signals from his smartphone, which the car has already been programmed to recognize. Attenuation of road noise, and sounds from the car radio, is a familiar audio signal processing operation. Voices can be recognized by stored voice models. If voice models are available, the number of different speakers can be identified by reference to how many models were matched. If voice models are not available, analysis of the audio (in conjunction with beam-forming use of multiple microphones, where available) can distinguish several different voices.)

Still another aspect of the present technology is an automated pairing of devices, such as Bluetooth devices. The two devices can infer, from shared context, that pairing is permitted. For example, the Bluetooth pairing protocol may follow stored rule data that causes devices to broadcast their GPS, accelerometer, and ambient audio-based information, for other devices to receive. If two devices find that their GPS, accelerometer, and ambient audio data match, the stored rules may automatically associate the two devices. By such arrangement, if the user drives a friend's car, or a rental car, the user's headset pairs with the vehicle's Bluetooth system without any user involvement. (The rules may specify that pairing not occur until certain conditions are met, such as both accelerometers simultaneously reporting acceleration above a threshold value.)

In some implementations, after the common-context conditions are detected, the user may be prompted to confirm that pairing is desired.

Once paired, the user might receive messages that are based on context generated by the car. These messages may be, e.g., service reminders, driving behavior advice for teens (based on car sensors and rules set by parents), likely road condition information (icy), reminders the user sent themselves about needing to obtain an item for the car (windshield wipers), etc.

While the earlier-detailed arrangements employed a first smartphone's camera to capture imagery from a second smartphone's screen, other embodiments can convey information otherwise, such as by audio, radio, etc. For example, a first smartphone can emit an audio signal, using its speaker, that is a function of first phone context. The second smartphone can capture this signal with its microphone, and use its own assessment of context to check the received information. Similarly, the first smartphone can issue a radio signal (e.g., Bluetooth, WiFi, Zigbee, RFID, etc.) that is a function of first phone context, which the second phone can then receive and check against its own contextual information.

Location (e.g., expressed by GPS coordinates) is a widely available type of context data that can be used in the arrangements detailed herein.

It will be recognized that the present technology is well suited for use in challenge-response arrangements. In such arrangements, a first smartphone poses a challenge (question), and the second smartphone must respond with a valid answer.

The challenge question may be a straightforward inquiry about a context value, e.g., report your location. The second phone provides the requested information, which is then evaluated by the first phone. Or the challenge may involve information other than contextual data. For example, the first phone may provide a number, and instruct the second phone to multiply that number by the fractional part of the second phone's latitude, and return the result. Or the first phone may ask the second phone to add the current POSIX time (i.e., seconds elapsed since Jan. 1, 1970 UTC) to the second phone's 10-digit telephone number, and return the result. Again, the first phone receives the response from the second phone, and compares it against the first phone's independent calculation of the requested information, and proceeds with a transaction only if the two data agree within expected error tolerances.

The detailed types of context are only a few of the many that might be used. One particular type of context involves historical information, e.g., stored in a smartphone memory. Common history that is experienced and recorded by two devices is a rich source of challenge/response data. Consider audio. Each smartphone may buffer recent ambient audio sampled by its microphone, and store it in association with corresponding timestamp data (from the cell phone network-synchronized smartphone clock). The first smartphone may challenge the second smartphone to identify the highest-amplitude frequency component (or second-highest, etc.) in a 100 ms window centered at POSIX time 1318445064. Convention may establish, or the challenge can specify, that the frequency component should be identified as a bin number in a 32 bin decomposition of the audio spectrum between 0 Hz and 3200 Hz. The second phone performs the requested calculation and returns the result to the first smartphone, which calculates the requested information independently, and compares the two answers.

Audio context may also be expressed by fingerprint data derived from the audio.

While the foregoing discussion often focused on action of one device in a transaction (e.g., Alice's HMD), it will be understood that the other device(s) involved in the transaction (e.g., Bob's HMD) performs corresponding operations.

Reference was made to analyzing different data streams for consistency (e.g., imagery depicting Bob's facial expressions, and audio recording his speech). One technique relies on machine learning. Facial imagery, audio and EEG data are collected from test subjects while they speak. The facial imagery is processed to identify robust feature points whose movements can be tracked (e.g., using generic image processing techniques such as SIFT or SURF, or by using domain specific feature points such as pupil location, nose, corners of mouth etc.). Likewise, distinctive features are identified in the audio and EEG data. A heuristic classifier examines the processed data to discern features in two or more data streams that appear associated, e.g., particular EEG signal features that recur each time a subject's mouth opens, or eyes blink. Confidence in the associations increases the more frequently they co-occur. With a few hours of training across several different subjects, a satisfactory data set comprising sensor signals that are consistently correlated is developed. This stored data then serves as a reference model against which live data sensed from speakers (e.g., Bob) is judged. These models can be used by the HMD locally or in the cloud for multiple purposes. Alice's HMD can do a confidence calculation that it is indeed Bob speaking (i.e., his voice is being created by the observed face).

(Related heuristic techniques have been employed in development of machine lip-reading systems—correlating lip movements to audio speech. That work is applicable here. Sample references appear below.)

A HMD with a self-directed camera was noted above. One such camera may capture imagery that includes one or both the user's eyes. Another may capture imagery that includes at least part of the user's cheek(s) and/or lips. Still another may capture all such information. Any such facial information can be useful in the detailed arrangements.

While reference has been made to smartphones and HMDs, it will be recognized that this technology finds utility with all manner of devices—usually portable, but also fixed. Portable music players, desktop computers, laptop computers, tablet computers, set-top boxes, televisions, netbooks, other wearable computers, servers, etc., can all make use of the principles detailed herein.

Particularly contemplated smartphones include the Apple iPhone 5, and smartphones following Google's Android specification (e.g., the Verizon Droid Eris phone, manufactured by HTC Corp., and the Motorola Droid 4 phone).

The term "smartphone" (or "cell phone") should be construed to encompass all such devices, even those that are not strictly-speaking cellular, nor telephones.

(Details of the iPhone, including its touch interface, are provided in Apple's published patent application 20080174570.)

The design of smartphones and other computers referenced in this disclosure is familiar to the artisan. As reviewed above, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc.).

The processes and arrangements detailed in this specification may be implemented as instructions for computing devices, including general purpose processor instructions for a variety of programmable processors, including microprocessors (e.g., the Atom and A5), graphics processing units (GPUs, such as the nVidia Tegra APX 2600), and digital signal processors (e.g., the Texas Instruments TMS320 series devices), etc. These instructions may be implemented as software, firmware, etc. These instructions can also be implemented in various forms of processor circuitry, including programmable logic devices, field programmable gate arrays, field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. "Cloud" computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Smartphones and other devices according to certain implementations of the present technology can include software modules for performing the different functions and acts.

Known browser software, communications software, and media processing software can be adapted for many of the uses detailed herein.

Although features and arrangements are described, in some cases, individually, applicant intends that they also be used together. Conversely, while certain systems are detailed as including multiple features, applicant conceives that—in other embodiments—the individual features thereof are usable independently.

Similarly, while this disclosure has detailed particular ordering of acts and particular combinations of elements, it will be recognized that other contemplated methods may re-order acts (possibly omitting some and adding others), and other contemplated combinations may omit some elements and add others, etc.

Likewise, aspects of the different embodiments can readily be changed and substituted. (E.g., embodiments described as conveying information by watermarking can instead convey information by text presentation or barcode. Data used as a cipher key in one embodiment can be used as a watermark spreading key in another. Etc.)

Although disclosed as complete systems, sub-combinations of the detailed arrangements are also separately contemplated.

While certain aspects of the technology have been described by reference to illustrative methods, it will be recognized that apparatus configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

References to communication between two devices (including references to transmitting and receiving) should be understood to encompass communications through intermediary devices and systems. (E.g., Alice's HMD may not communicate directly with Bob's HMD, but rather through intermediate routers, computers, etc.)

This specification refers, in some instances, to recent history (e.g., audio recently sampled). The meaning of recent can vary with different applications. Typically, it means within the past hour, and more commonly within the past 10, or 3 or 1 minutes, or 30 or 10 seconds. However, in some applications this period can go back a day, a week, a year, or longer.

Likewise, the error tolerance within which two values are deemed to correspond (or not) depends on application. In some applications, correspondence within 5% may be used. In others a looser standard may be employed (e.g., 10% or 15% or more). In others a tighter tolerance may be applied (e.g., agreement within 3%, or 1%, or 0.3%). Etc.

Exemplary digital watermarking techniques are taught in the assignee's patent documents U.S. Pat. No. 6,590,996 and 20100150434. Robust hashing of audio is described, e.g., in patent documents 20020178410 and U.S. Pat. No. 6,996, 273. Robust generation of shared key data (e.g., for Bluetooth pairing) is detailed in Kirovski, The Martini Synch: Joint Fuzzy Hashing Via Error Correction, Security and Privacy in Ad-hoc and Sensor Networks, LNCS Vol. 4572, pp. 16-30 (2007).

Examples of audio fingerprinting are detailed in patent publications 20070250716, 20070174059 and 20080300011 (Digimarc), 20080276265, 20070274537 and 20050232411 (Nielsen), 20070124756 (Google), U.S. Pat. No. 7,516,074 (Auditude), and U.S. Pat. Nos. 6,990,453 and 7,359,889 (Shazam).

Electroencephalography sensors and associated systems are detailed, e.g., in published patent documents 20090112077, 20090281408, 20090156925, 20080177197, 20090214060, 20120245450, and 20110040202 (all to NeuroSky), 20070185697 (Microsoft), and 20080235164 (Nokia).

Lip reading systems are detailed, e.g., in published patent documents 20110071830 (Hyundai), 20100332229 (Sony), 20100189305 (Eldon), and 20100079573 (Sony Ericsson). See, also, Cetingul et al, Discriminative Analysis of Lip Motion Features for Speaker Identification and Speech-Reading, IEEE Trans. on Image Processing, Vol. 15, No. 10, 2006, pp. 2879-2891; and Perez, et al, Lip Reading for Robust Speech Recognition on Embedded Devices, Int. Conf. Acoustics, Speech and Signal Processing (ICASSP), 2005, pp. 473-476, and papers cited therein.

Head-mounted display systems, and related technology, are detailed, e.g., in published patent documents U.S. Pat. Nos. 8,235,529, 8,223,088, 8,203,605, 8,183,997, 8,217, 856, 8,190,749 and 8,184,070 (Google); 20080088936, 20080088529, 20080088937 and 20100079356 (Apple); and 20120229909, 20120113092, 20050027515 and 20120068913 (Microsoft).

Patent publication US20110251493 details technology by which physiological parameters for a person can be discerned by analysis of facial imagery.

Arrangements for recognizing pornography from imagery are detailed, e.g., in published patent documents 20090123064, 20080159627, and 20080159624.

Social network graphs, their uses, and related technology, are detailed in applicant's applications Ser. No. 13/425,339, filed Mar. 20, 2012 (now U.S. Pat. No. 9,402,099), and Ser. No. 13/572,873, filed Aug. 13, 2012 (published as 20120311623).

Prior art uses of context in security applications are detailed in Sigg, Context-Based Security: State of The Art, Open Research Topics and a Case Study, 5th ACM Intl Workshop on Context-Awareness for Self-Managing Systems, 2011; and in Mayrhofer, The Candidate Key Protocol For Generating Secret Shared Keys From Similar Sensor Data Streams, Security and Privacy in Ad-hoc and Sensor Networks, pp. 1-15, 2007 (attached as Appendices A and B to the provisional parent application 61/546,494).

Bluetooth is familiar to artisans. A Wikipedia article about Bluetooth is attached as Appendix D to parent provisional application 61/546,494.

The prior art references identified herein are assumed to be familiar to artisans implementing the present technology.

To review, certain aspects of the technology involve a device obtaining one or more context parameters, such as date and/or time of day, information based on visual stimulus recently sensed by the first device, sensed radio transmissions, sensed RFID data, orientation sensor data, magnetometer data, acceleration sensor data, audio classification data output from a logical sensor, activity classification data, or barometric sensor data. The device generates a signal based, at least in part, on one or more of these parameters, and transmits the signal to a second device. The second device may use the signal to authenticate a transaction, establish an ad hoc network with the first device, establish a logical link with the first device, make a determination, etc.

The transmission of the signal to the second device can be by an image presented by the first device, and sensed by a camera in the second device. The image can convey a machine-readable representation of the signal, such as a barcode, or a digital watermark steganographically encoded into some other image display. Alternatively, the signal can be transmitted by audio, radio, or otherwise.

Other aspects of the technology involve shared context determinations in connection with social networking. For example, a friend request may be issued, or accepted, based at least in part on a finding that two devices share certain contextual similarities.

Still other aspects of the technology involve triggering presentation of a message to a user, at a time when certain context conditions are met (as determined by reference to obtained context data).

Yet other aspects employ archived historical context information is archived in connection with other devices, e.g., in challenge-response authentication.

Still other aspects concern headworn apparatuses that sense biometric information from the head of a user (e.g., EEG, facial imagery), and transmit corresponding data for use by another device (e.g., in connection with an authentication transaction).

While this specification earlier noted its relation to the assignee's previous patent filings, it bears repeating. These disclosures should be read in concert and construed as a whole. Applicant intends that the features, methods, elements, concepts and enablement details disclosed in the present application be combined with the features, methods, elements, concepts and enablement details described in those related applications. Implementation of such combinations is straightforward to the artisan from the provided teachings.

To provide a comprehensive disclosure, while complying with the 35 USC Section 112 mandate of conciseness, applicant incorporates-by-reference the patent and other documents referenced herein. Such materials are incorporated in their entireties, even if cited above in connection with specific of their teachings. These references disclose technologies and teachings that applicant intends be incorporated into the arrangements detailed herein, and into which the technologies and teachings detailed herein be incorporated.

In view of the wide variety of embodiments to which the principles and features discussed above can be applied, it should be apparent that the detailed embodiments are illustrative only, and should not be taken as limiting the scope of the invention. Rather, I claim as my invention all such modifications as may come within the scope and spirit of the following claims and equivalents thereof.

I claim:

1. A method for authenticating a transaction between first and second devices to increase security, one of said devices being a consumer's mobile device, the other of said devices comprising a transaction terminal, the second device being equipped with a microphone to sense audio emitted by the first device, the method being performed by the first device and comprising the acts:

using a sensor in the first device, obtaining one or more context parameters of the first device selected from the list:
information based on visual stimulus recently sensed by the first device;
sensed radio transmissions;
sensed RFID data;
orientation sensor data;
magnetometer data;
acceleration sensor data;
audio classification data, received from a logical sensor fed by information both from an audio sensor and another sensor;
activity classification data; and
barometric sensor data;
in the first device, generating an audio signal based, at least in part, on said obtained context parameter(s) of the first device; and
presenting the audio signal from the first device, for sensing by the microphone of the second device, for use by the second device to authenticate the transaction;
wherein the audio presented from the first device can be processed by the second device to determine whether the context parameter of the first device, on which the presented audio signal is based, is consistent with a context parameter independently sensed by the second device, thereby increasing security of the transaction.

2. The method of claim 1 that includes processing a parameter obtained from a logical sensor to generate the audio signal, the logical sensor being fed by information from plural different sensors.

3. The method of claim 1 that further includes encrypting information conveyed in said presented audio, in accordance with a private key associated with the first device.

4. The method of claim 1 that includes obtaining, and generating the audio signal based at least in part on, information based on visual stimulus recently sensed by the first device.

5. The method of claim 1 that includes obtaining, and generating the audio signal based at least in part on, sensed radio transmissions.

6. The method of claim 1 that includes obtaining, and generating the audio signal based at least in part on, sensed RFID data.

7. The method of claim 1 that includes obtaining, and generating the audio signal based at least in part on, orientation sensor data.

8. The method of claim 1 that includes obtaining, and generating the audio signal based at least in part on, magnetometer data.

9. The method of claim 1 that includes obtaining, and generating the audio signal based at least in part on, acceleration sensor data.

10. The method of claim 1 that includes obtaining, and generating the audio signal based at least in part on, audio classification data, received from a logical sensor fed by information both from an audio sensor and another sensor.

11. The method of claim 1 that includes obtaining, and generating the audio signal based at least in part on, activity classification data.

12. The method of claim 1 that includes obtaining, and generating the audio signal based at least in part on, barometric sensor data.

13. The method of claim 1 in which said information based on visual stimulus recently sensed by the first device, is information based on visual stimulus sensed in a 10 minute interval immediately prior to performance of said method.

14. A method for authenticating a transaction between first and second devices to increase security, one of said devices being a consumer's mobile device, the other of said devices comprising a transaction terminal, the second device being equipped with a microphone to sense audio emitted by the first device, the method being performed by the second device and comprising the acts:

sensing audio presented by the first device, using the microphone of the second device;

the second device obtaining one or more context parameters selected from the list:
  information based on visual stimulus recently sensed by the second device;
  sensed radio transmissions;
  sensed RFID data;
  orientation sensor data;
  magnetometer data;
  acceleration sensor data;
  audio classification data, received from a logical sensor fed by information both from an audio sensor and another sensor;
  activity classification data; and
  barometric sensor data;

in the second device, processing the audio sensed from the first device to determine whether a context parameter of the first device, on which the audio signal is based, is consistent with the context parameter obtained by the second device, to thereby increase security of the transaction.

15. The method of claim 14 in which the processing comprises:
 processing the obtained parameter(s) to yield second authentication data;
 deriving first authentication data from the sensed audio; and
 comparing the first and second authentication data.

16. The method of claim 14 in which the processing comprises:
 processing the obtained parameter(s) to yield second authentication data;
 deriving first authentication data from the sensed audio; and
 comparing the first and second authentication data.

17. The method of claim 14 in which said information based on visual stimulus recently sensed by the first device, is information based on visual stimulus sensed in a 10 minute interval immediately prior to performance of said method.

18. A method of enhancing security of a logical link established between first and second devices, one of said devices being a consumer's mobile device, the other of said devices comprising a transaction terminal, the second device being equipped with a microphone to sense audio emitted by the first device, the method comprising the acts:

the first device sensing context of the first device, said first device context comprising at least two of the following:
  recent audio stimulus;
  recent visual stimulus;
  recent radio stimulus;
  orientation data;
  magnetic field data; and
  barometric data;

transferring context data, by an audio signal, between the first and second devices;

determining that said sensed context of the first device corresponds to a context sensed by the second device; and based on said determination, establishing a logical link between the first and second devices.

19. The method of claim 18 that includes, based on said determination, establishing an ad hoc wireless connection between the first device and the second device, such as by Bluetooth.

20. The method of claim 18 in which said recent audio stimulus, said recent visual stimulus, and said recent radio stimulus, are audio, visual and radio stimuli, respectively, received in a 10 minute interval immediately prior to performance of said method.

\* \* \* \* \*

UNITED STATES PATENT AND TRADEMARK OFFICE
CERTIFICATE OF CORRECTION

PATENT NO. : 9,883,396 B2
APPLICATION NO. : 15/273375
DATED : January 30, 2018
INVENTOR(S) : Tony F. Rodriguez Page 1 of 1

It is certified that error appears in the above-identified patent and that said Letters Patent is hereby corrected as shown below:

In the Claims

Column 25, Claim 16, Lines 35-36: delete "second authentication" and insert --key--

Column 25, Claim 16, Line 37: delete "deriving first authentication data" and insert --using the key data to extract information--

Column 25, Claim 16, Line 39: delete "comparing the first and second authentication data." and insert --taking an action based on the extracted information.--

Signed and Sealed this
Thirty-first Day of July, 2018

Andrei Iancu
*Director of the United States Patent and Trademark Office*